Aug. 25, 1959   L. N. CHRISTENSEN   2,901,268
DRAG EVENER
Filed Oct. 15, 1956
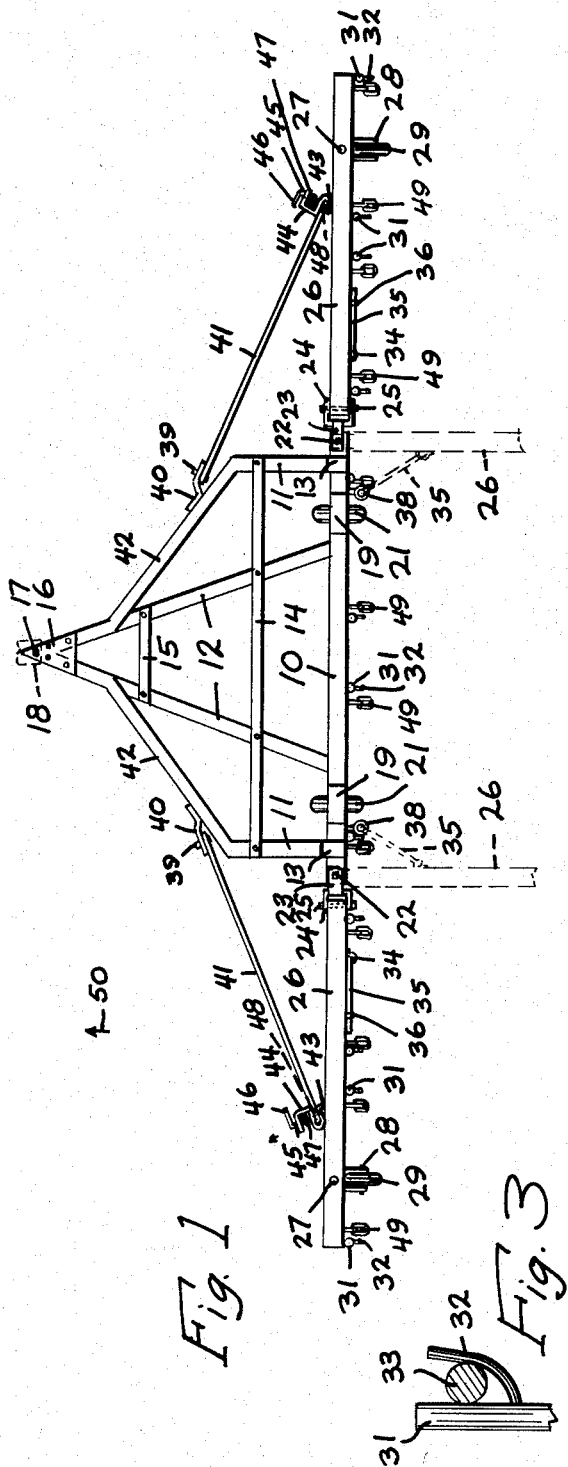
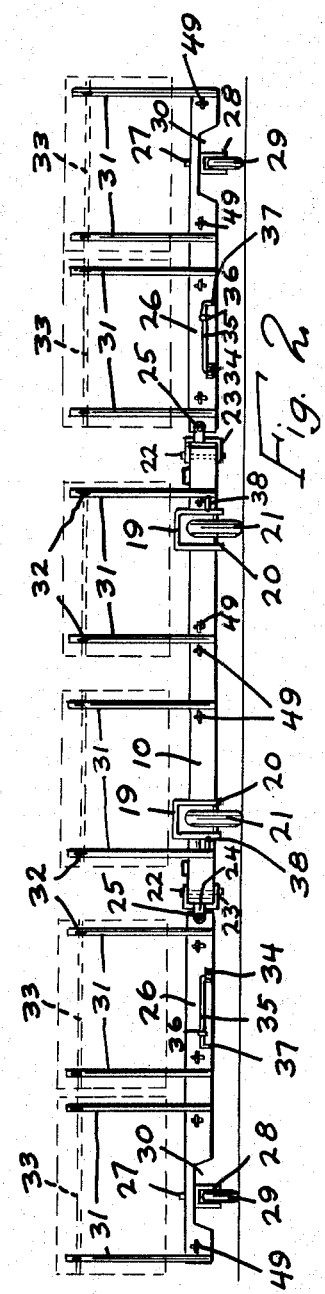
INVENTOR.
Lars N. Christensen
BY
ATTORNEY 2,901,268

DRAG EVENER

Lars N. Christensen, Viborg, S. Dak.

Application October 15, 1956, Serial No. 615,860

1 Claim. (Cl. 280—411)

My invention pertains to a drag evener.

An object of my invention is to provide a drag evener which is articulated so as to efficiently follow the ground contour.

A further object of my invention is to provide an arrangement in which the drag evener is supported by suitable wheels.

A further object of my invention is to provide an arrangement in which the drag evener can be collapsed to a minimum size for passing through gates, etc.

A further object of my invention is to provide a drag evener in which the collapsed arrangement is securely held when passing through such gates.

A further object of my invention is to provide a drag evener which will efficiently support and carry the harrows which are drawn by the drag evener, when such is desired.

A further object of my invention is to provide a simple structure.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the drag evener,

Figure 2 is a rear view of Figure 1, and

Figure 3 is a detail.

My invention contemplates the provision of a drag evener in which the outer sections principally will be pivotally mounted for movement in a vertical as well as a horizontal plane, so that the evener will follow the contours of the ground, and so that the outer portions can be collapsed or folded inwardly and then retained in inward position so that the arrangement can be conveniently drawn through a restricted gate opening.

I have used the character 10 to designate the centrally positioned beam of the drag evener to which are attached the forwardly extending braces 11, which braces 11 are secured to the further braces 12, which braces 12 are attached at 13 to the member 10, the characters 14 and 15 indicating further braces, the members 12 being secured at their forward ends by means of the gusset 16 which is adapted to be attached as at 17 to the towing beam 18 for towing the arrangement.

Attached to the member 10 are the U-shaped brackets 19 to which are journalled the shafts 20, which shafts carry the wheels 21.

Pivotally attached at the ends of the members 10 at 22 by means of suitable bolts are the U-shaped clevises 23 from which clevises extend the ears 24 which in turn are pivotally bolted at 25 to the further outwardly extending sections 26, and extending upwardly through the members 26 are the pins 27 which are attached to the U-shaped frame portions 28 to which are journalled the further wheels 29, this construction providing caster wheels which will follow the movement of the unit, these frames and wheels being received within the cut-out portions 30.

Attached at spaced intervals along the members 10 and 26 are the vertically positioned rods 31 having the hook portions 32 (see Figure 3), these rods being spaced so as to permit the attachment of the harrow sections when it is desired to carry the harrow sections in through a gate and away from the field, in which case one of the bars 33 of the harrows is placed in the hooks 32 so that the harrows will then be supported in vertical position as shown by the dotted lines in Figure 2, so that when the outer pieces 26 are folded inwardly as will be explained, the harrow sections will be transported through a gate and the like.

Pivotally attached at 34 to the sections 26 are the rods 35 which are normally retained by the clips 36 but which can be disengaged therefrom, the rods 35 terminating in the downwardly extending portions 37 which portions are adapted to be received in the eye members 38 when the sections 26 are in folded position as shown by dotted lines in Figure 1, these eye members being secured to the central member 10.

Pivotally bolted at 39 to the short straps 40 are the lengthened bars 41, the straps 40 being secured to further brace portions 42 which are secured to the members 12.

Secured at 43 to the outer sections 26 are the substantially U-shaped retainers 44 through which pass the pins 45 terminating in the handle portions 46, these pins being spring-urged by means of the springs 47 into suitable openings at 48, which openings are provided in the bars 41, this arrangement thereby serving to rigidly support the entire unit in its expanded position as shown in Figures 1 and 2, and when it is desired to travel with the unit away from the field, the handle 46 is pulled outwardly allowing release of the bars 41 which can then be folded upwardly after which the members 26 can be folded inwardly and retained by means of the bars 35 as explained hereinabove.

Attached to the sections 10 and 26 are suitable short chains 49 which are spaced so as to be connected to the harrows when the harrows are being pulled by the drag evener.

In operation the device is pulled forwardly in the direction of the arrow 50 (see Figure 1) with the harrows being pulled behind in the usual manner, and when it is desired to pass through a gate or the like, the various sections can be folded as above described and the harrows can be supported as described. It will be noted that the joints at the members 23, 24 will permit complete articulation at these points so that the device will travel over uneven ground, and can also be folded inwardly as explained, and it will also be noted that the various sections can be replaced in operating position.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A drag evener comprising a central section, outer sections pivotally attached to said central section, said outer sections being movable in a vertical and a horizontal plane, a forwardly extending framework attached to said central section, means attached between said framework and said outer sections for retaining said outer sections in alignment with said central section including bars pivoted to said framework and secured to said outer sections, substantially U-shaped retainers attached to said outer sections, spring urged pins passing through said retainers, said bars having openings for receiving said pins, means for pulling said pins outwardly to release said bars so that said outer sections can be folded inwardly, said central section and said outer sections including a plurality of vertically positioned spaced rods attached thereto, said rods having hook portions upon which harrows can be supported, said central section including substantially U-shaped supports secured thereto, ground-engaging wheels journalled in said supports, caster wheels journalled in said outer sections, the pivotal attachment of said outer sections and said central section including horizontally spaced ears to which said outer sections are pivoted, and vertically spaced ears attached thereto to which said central section is pivoted.

References Cited in the file of this patent

UNITED STATES PATENTS

| | | |
|---|---|---|
| 1,253,831 | James | Jan. 15, 1918 |
| 1,927,458 | Klise | Sept. 19, 1933 |
| 2,597,533 | Rogers | May 20, 1952 |

FOREIGN PATENTS

| | | |
|---|---|---|
| 683,357 | Great Britain | Nov. 26, 1952 |